United States Patent
Malayev

(12) 
(10) Patent No.: US 7,139,070 B2
(45) Date of Patent: Nov. 21, 2006

(54) ULTRA-FAST TEMPERATURE SWITCH FOR MICROSCOPIC SAMPLES

(76) Inventor: Andrew Alexandrovich Malayev, 4527 52nd St., San Diego, CA (US) 92115

( * ) Notice: Subject to any disclaimer, the term of this patent is extended or adjusted under 35 U.S.C. 154(b) by 117 days.

(21) Appl. No.: 11/047,241

(22) Filed: Jan. 31, 2005

(65) Prior Publication Data

US 2006/0171026 A1   Aug. 3, 2006

(51) Int. Cl.
*G01N 1/10* (2006.01)
(52) U.S. Cl. ........................ 356/246; 359/398
(58) Field of Classification Search ................ 356/246
See application file for complete search history.

(56) References Cited

U.S. PATENT DOCUMENTS

2004/0219732 A1* 11/2004 Burns et al. ................ 438/200

2005/0003550 A1* 1/2005 Kyne ............................ 436/2

FOREIGN PATENT DOCUMENTS

JP        03278015 A  * 12/1991

* cited by examiner

*Primary Examiner*—Mark A. Robinson
*Assistant Examiner*—Scott Stephens

(57) ABSTRACT

A device for producing rapid temperature changes around microscopic samples comprises two hollow channels (5,6) positioned at the same plane but at an angle to each other, FIG. 1. Streams of solutions (9, 10) flowing from the respective channels are maintained at different temperatures through heating or cooling elements (7, 8) conducting heat to or away from the channels. Initially, the sample (12) is surrounded by stream (9) at initial temperature, FIG. 3. After flow of this stream stops, the sample is surrounded by another stream (10) at a different temperature. This results in the temperature change, which does not depend on the volume of liquid in the system and on the size of heating or cooling elements.

2 Claims, 1 Drawing Sheet

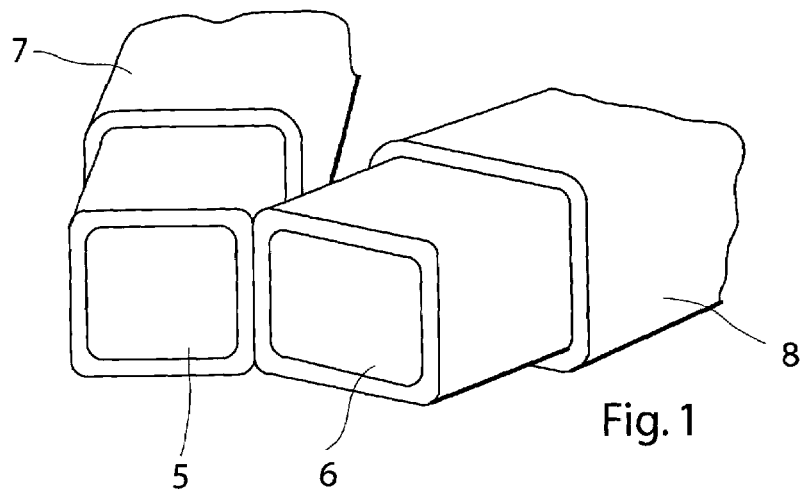
Fig. 1
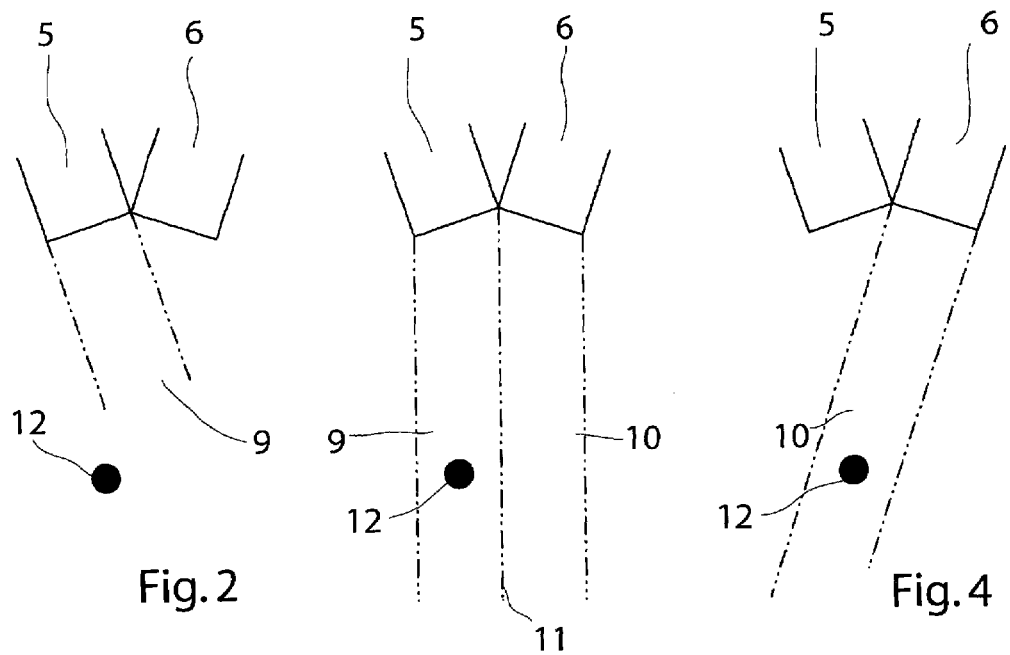
Fig. 2   Fig. 4
Fig. 3

US 7,139,070 B2

ULTRA-FAST TEMPERATURE SWITCH FOR MICROSCOPIC SAMPLES

CROSS REFERENCES TO RELATED APPLICATIONS

Not Applicable

FEDERALLY SPONSORED RESEARCH

Not Applicable

SEQUENCE LISTING OR PROGRAM

Not Applicable

BACKGROUND—FIELD OF INVENTION

This invention relates to temperature, specifically to ways of changing temperature around microscopic particles.

BACKGROUND—PRIOR ART

In many applications involving microscopic samples, the temperature control is achieved indirectly by using relatively large heaters or coolers adjacent to the sample. These heaters conduct heat to the sample, if it has lower than reference temperature, and coolers conduct heat away from the sample, if it has higher than reference temperature. One common example is heating biological samples in petri dishes by surrounding the dish with a heated ring. Although this way can effectively control the temperature at a fixed reference value, it does not provide means of fast temperature changes. This limitation is due to the fact that heating or cooling elements require some energy to heat themselves. Furthermore, since most microscopic samples are surrounded by large volumes of liquid medium, especially live samples, the medium itself needs to be heated or cooled first to achieve the required temperature change. The time of the temperature change also depends on how different the initial temperature from the new temperature. The bigger temperature change should be achieved, the longer time it will take.

OBJECTS AND ADVANTAGES

Accordingly, the object and advantages of my invention are to provide a method of rapid temperature change, the time rate of which is not limited by the size of heating or cooling elements, and is not limited by the volume of liquid surrounding the sample.

Still further objects and advantages will become apparent from a consideration of the ensuing description and accompanying drawings.

SUMMARY

A method of fast temperature switch comprises two channels, streams of liquid solutions flowing out of the channels, forming an interface between the streams, maintaining the solutions at different temperatures, placing a sample and channels so that sample is initially inside stream at one temperature, slowing or stopping the flow rate of stream, moving interface between streams so that sample is inside the second stream at different temperature.

DRAWINGS—FIGURES

FIG. 1 is a perspective view of Temperature Switch, showing two hollow channels adjacent to each other at an angle and heating elements attached to channels.

FIG. 2 shows stream of liquid solution flowing straight from one channel.

FIG. 3 shows streams of two liquid solutions flowing from both channels, before the temperature switch. The streams are flowing in parallel. The temperatures of these two solutions are different. First, the sample is surrounded by the liquid solution at the initial temperature.

FIG. 4 shows stream of liquid solutions flowing from the second channel after the flow of solution at the initial temperature is stopped. The sample is surrounded by solution at a different temperature, providing the temperature change.

DRAWINGS—REFERENCE NUMERALS 5 channel
6 channel
8 heating/cooling element
8 heating/cooling element
9 stream of liquid from channel 5
10 stream of liquid from channel 6
11 interface between streams 9 and 10
12 sample

DETAILED DESCRIPTION—PREFERRED EMBODIMENT

FIG. 1 shows two hollow channels 5 and 6, the ends of which are adjacent at an angle in accordance with the invention. The channels are surrounded by heating or cooling elements 7 and 8, which regulate the temperature of liquid flowing inside the channels and maintain the liquids at different reference temperatures.

FIG. 2 shows that the liquid, flowing out from channel 5, forms a straight stream along the projections of channel's walls. The temperature of this solution is equal to the temperature of medium surrounding the sample 12.

FIG. 3 shows direction of two streams 9 and 10 flowing out of the channels 5 and 6. Since the channels are positioned in the same plane but at an angle to each other, liquids flowing out from the channels will interact with each other and streams will deviate from the straight projections. Instead, the directions of these two streams will be parallel to each other. The flowing liquids will also form an interface 11 of a temperature gradient between each other. The channels are positioned relative to the sample 12 so that the sample is inside stream 9 at initial temperature.

FIG. 4 shows that after flow of liquid from channel 5 stops, liquid flowing from the channel 6 will form a stream 9 flowing straight along projections of the channel's walls. This results to surrounding of sample 12 with solution 10, which is maintained at a different temperature.

The time rate of this change will depend on thickness of the interface 11 and the size of sample 12, but does not depend on the volume of medium surrounding the sample or on the size of heating elements 7 and 8.

Operation—FIG. 2, 3, 4

Ultra-Fast Temperature Switch effectively functions as follows: First, hollow channels 5 and 6 with liquids at different temperatures and a microscopic sample 12 should be positioned relative to each other. The sample should be inside the stream 9 flowing out from channel 5, when the stream 9 flows in parallel with stream 10 from channel 6, FIG. 3. The sample also should be inside stream 10 flowing out of channel 6, when it is flowing straight from the channel, FIG. 4. The correct position of the sample can be determined in tests runs, when the channels are filled with colored solutions and positions of interface 11, FIG. 3, and stream 10, FIG. 4, are clearly visible. In case of samples attached to a substrate, coverslips for example, the way to determine the correct sample position is to mark the substrate with projection lines 11, and borders of stream 10, FIG. 4, before placing sample 12 on the substrate. The temperature before and after the switch can be also determined in these test runs by placing a temperature probe, instead of sample 12, to measure the temperature.

The channels 5 and 6 are capable of delivering liquid solutions at different temperatures. This can be done by any conventional way, the common of which is to attach heating elements 7 and 8 directly to the outside surface of the channels, FIG. 1. The heating elements conduct regulated heat to the content of the channels to maintain the required temperatures inside the channels. If lower temperatures are required the channels can be attached to cooling elements as well.

After channels 5 and 6, and sample 12 are in the correct position relative to each other, stream of liquid 9 flows out of the channel 5 FIG. 2. The temperature of this liquid is the same as the temperature of the medium surrounding the sample, the initial temperature.

Then, liquid from channel 6 forms stream 10 in parallel with stream 9, FIG. 3. These two streams form interface 11 between each other. The position of interface 11 will change, if the flow rate of any stream changes. After the interface crosses over the sample 12, the sample will be surrounded by liquid at different temperature resulting in the sample's temperature change.

The simple way to achieve this is to stop the liquid flow from channel 5. FIG. 4 shows that stream 10, flowing from channel 6, surrounds the sample completely after flow of liquid from channel 5 stopped. Since the temperature of the liquid inside stream 10 is different from the initial temperature, the temperature of the sample 12 will also change.

Advantages

The rate of this temperature change does not depend on the volume of medium surrounding the sample, or on the size of heating and cooling elements 7 and 8.

Other Embodiments

Channels Formed Inside a Single Unit—Description

Another way to form the channels 5 and 6 is to carve them inside a single unit of appropriate material. The heating elements 7 and 8 can be attached to the outside surfaces of the unit to provide different regulated temperatures inside the channels.

Channels Formed Inside a Single Unit—Operation

The described alternative will operate the same way as the system described in the main embodiment.

Conclusions, Ramification, and Scope

Accordingly, the described system provides a new method of changing temperature of microscopic samples. This method is faster because it does not depend on the volume of medium surrounding the sample and does not depend on the size of heating or cooling elements. It can be used with microscopic samples maintained in liquid or gas medium.

Although the description above contains many specificities, these should not be construed as limiting the scope of the invention but as merely providing illustrations of some of the presently preferred embodiments of this invention. Various other embodiments and ramifications are possible within it's scope. For example, the sample can be initially suspended in gas mixture instead of liquid. In this case gas mixtures at different temperatures can be flowing from the channels instead of liquid solutions.

Thus the scope of the invention should be determined by the appended claims and their legal equivalents, rather than by the examples given.

What is claimed is:

1. A method of fast temperature switch of microscopic sample comprising:
    a) two channels filled with liquid solutions
    b) means of providing controlled flow of liquid out of said channels
    c) means of maintaining said liquids at different temperatures
    d) means of positioning a sample and said channels so that said sample is initially inside a stream of liquid from one channel, while solutions are flowing parallel to each other
    e) slowing or stopping the flow of said stream
    f) whereby upon changing the flow rate of said stream, said microscope sample will be inside the second stream, which is at a different temperature.

2. A method of fast temperature switch of microscopic sample comprising:
    a) two channels filled with gas mixture solutions
    b) means of providing controlled flow of gas mixtures out of said channels
    c) means of maintaining said gas mixtures at different temperatures
    d) means of positioning a sample and said channels so that said sample is initially inside a stream of the gas mixture from one channel, while solutions are flowing parallel to each other
    e) slowing or stopping the flow of said stream
    f) whereby upon changing the flow rate of said stream, said microscope sample will be inside the second stream, which is at a different temperature.

* * * * *